United States Patent [19]

Mouesca et al.

[11] Patent Number: 4,933,138

[45] Date of Patent: Jun. 12, 1990

[54] SPACER-GRID FOR A FUEL ASSEMBLY OF A LIGHT WATER NUCLEAR REACTOR

[75] Inventors: Bruno Mouesca, Meximieux; Jean-Pierre Denizou, Craponne, both of France

[73] Assignees: Framatome, Courbevoie; Cogema, Villacoublay, both of France

[21] Appl. No.: 204,319

[22] Filed: Jun. 9, 1988

[30] Foreign Application Priority Data

Jun. 9, 1987 [FR] France .................. 87 08006

[51] Int. Cl.⁵ .............................. G21C 3/34
[52] U.S. Cl. ...................... 376/442; 376/438; 376/439; 376/443
[58] Field of Search ............ 376/438, 442, 439, 443

[56] References Cited

U.S. PATENT DOCUMENTS 3,806,410  4/1974  Ripley ................ 376/442
4,306,937 12/1981  Hensolt .............. 376/442
4,312,706  1/1982  Snyder ............... 376/442
4,765,949  8/1988  Denizou ............. 376/443

FOREIGN PATENT DOCUMENTS

2162641  7/1973  France .
2368117  5/1978  France .
2477755  9/1981  France .

Primary Examiner—Donald P. Walsh
Attorney, Agent, or Firm—Pollock, Vande Sande & Priddy

[57] ABSTRACT

The spacer-grid comprises at least one single-piece plate (1) through which extend a group of openings (2) at least a part of which constitutes an even network of passages (2) for the fuel rods and the guide tubes of the fuel assembly. The spacer-grid may be formed by one single-piece plate (1) of great thickness or by the association of a plurality of parallel single-piece plates interconnected by an outer girdle element.

15 Claims, 12 Drawing Sheets

FIG_2a

FIG_2b

SPACER-GRID FOR A FUEL ASSEMBLY OF A LIGHT WATER NUCLEAR REACTOR

FIELD OF THE INVENTION

The invention relates to a spacer-grid for a fuel assembly of a light water nuclear reactor.

BACKGROUND OF THE INVENTION

Fuel assemblies of nuclear reactors cooled with light water are generally formed by a bundle of fuel rods, i.e., tubes of a material having a low neutron absorption power, filled with pellets of fissile material. The bundle is usually assembled by means of elements disposed at each of the ends of the assembly. For the transverse maintenance of the fuel rods in the bundle, spacer-grids are generally used which are spaced apart along the length of the rod. Each of the spacer-grids defines an even network of passages adapted to receive the fuel rods or guide tubes which are substituted for certain fuel rods within the bundle. The guide tubes are generally connected to end elements or plates disposed at each of the ends of the assembly and in this way ensure the cohesion and the rigidity of the assembly. Furthermore, the guide tubes guide the absorbent rods which are interconnected to constitute clusters which may be shifted along the length of the assembly. These clusters or control bars ensure the control of the nuclear reactor by the displacement thereof in the direction of the height of the core of the reactor which is generaly constituted by assemblies placed side by side in the vertical direction.

Furthermore, in some types of reactor of recent design, called "spectrum variation reactors", certain guide tubes enable spectrum variation bars to be introduced in the core.

In the fuel assemblies of reactors prsently in service, in particular pressurized water nuclear reactors, the spacer-grids are generally constituted by small plates of thin zirconium alloy sheets assembled together by welding. Each of the spacer plates is constituted by about 40 small plates which are obtained from a thin zirconium alloy sheet by blanking and press-forming. The small plates are then assembled and interconnected to constitute the spacer-grid. The assembly of a grid requires about 700 welds to be effected. Furthermore, added elements may be associated with the small plates for the maintenance of the fuel rods in the passages or cells of the grid.

The grids formed in this way result in wide cumulated tolerance ranges.

The structure of a spacer-grid of a fuel assembly for a reactor cooled with light water is therefore extremely complex and requires long and costly operations for its manufacture. Furthermore, the present evolution in the design of fuel assemblies tends toward an increase in the density of the network of fuel rods which generally results in practice in changing from a square lattice network to a triangular lattice network. Lastly, the spacer-grids must also perform functions other than the mere transverse maintenance of the fuel rods, for example functions concerning the distribution and mixture of the cooling water circulating in the assembly.

All these requirements still further complicate the design and manufacture of the spacer-grids.

Fuel elements are known which are intended for nuclear reactors cooled with heavy water and which are constituted by cylindrical rods of fissile or fertile material mounted within a tubular case. French Patent No. 2 028 039, discloses a spacer for such a fuel element, constituted by an element in the form of a machined disc which defines passages for the fuel rods. The zones of contact of the passages with the fuel rods are constituted by cylindrical surfaces whose radius of curvature is a little larger than the radius of curvature of the fuel rods.

Such spacers, which have a radiating symmetry and have a small number of passages for the fuel rods, are in no way comparable to spacer-grids for a fuel assembly of a light water nuclear reactor whose rods are disposed in a dense square or triangular lattice network. For example, an assembly of a pressurized water nuclear reactor contains, in a current configuration, 264 fuel rods disposed in a square lattice network and 25 guide tubes disposed symmetrically in the grid.

Furthermore, the fuel elements for which the spacers described in French Patent No. 2 028 039 are intended do not include guide tubes, are placed in a horizontal position in the nuclear reactor and have a structure which is in no way comparable to that of an assembly for a light water reactor.

SUMMARY OF THE INVENTION

An object of the invention is therefore to provide a spacer-grid for a fuel assembly of a light water nuclear reactor constituted by a network of parallel fuel rods in which some rods are replaced by guide tubes and whose transverse maintenance is ensured by a plurality of spacer-grids spaced along the length of the rods and each defining an even network of passages adapted to receive the fuel rods and the guide tubes, this spacer-grid having a simple and strong structure capable of being adapted to any type of assembly, irrespective of the type and dimensions of the network of fuel rods, and manufactured by relatively simple and cheap operations involving a minimum number of welding or assembling steps.

For this purpose, the spacer-grid according to the invention comprises at least one single-piece plate through which extends a group of openings at least a part of which constitutes a network of passages for all of the rods and the guide tubes of the assembly.

BRIEF DESCRIPTION OF THE DRAWINGS

Several embodiments of the invention will now be described by way of example, with reference to the accompanying drawings.

DESCRIPTION OF PREFERRED EMBODIMENTS

Figure 1:
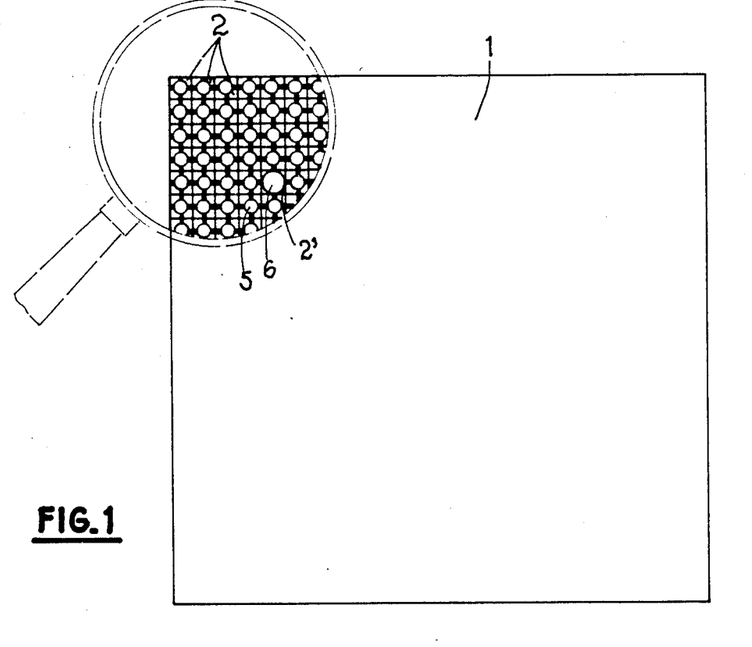
FIG. 1 is a partial plan view of a spacer-grid according to the invention defining a square lattice network.

FIG. 1 shows a plate 1 provided with a network of openings 2 throughout its thickness and thus constituting a single-piece grid whose walls and cells have been made by machining a plate. This machining may be carried out by one of the processes mentioned hereinafter. The network of openings 2, each of which constitutes a cell of the grid, is a square lattice network one side of which corresponds to the spacing of the fuel rods in a pressurized water nuclear reactor assembly. For such an assembly, the side a of the lattice of the network has a length of between 9 and 15 mm.

Figure 2:
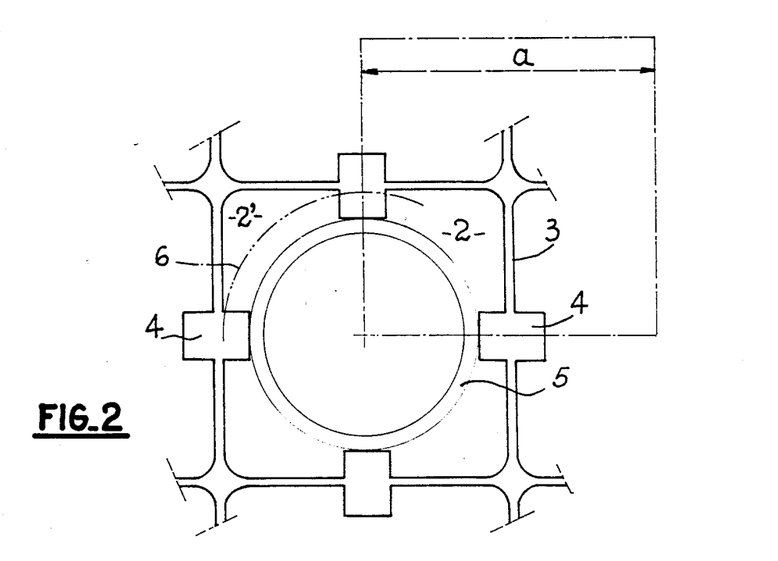
FIG. 2 is a view to an enlarged scale of a cell of the grid shown in FIG. 1.

As can be seen in FIGS. 1 and 2, the openings 2 in the plate are so machined that the walls 3 of the cells of the grid each have a thickened central portion 4 which projects from both sides of the wall 3, i.e., into two adjacent cells 2. These thickened portions 4 constitute bearing bosses for the fuel rods 5. The space provided between the confronting surfaces of two bosses 4 of a given cell 2 substantially corresponds to the outside diameter of a fuel rod 5. Each of the cells 2 has two sets of opposed bosses so that each of the rods 5 is in bearing relation to the bosses along four generatrices which are diametrically opposed in pairs within the corresponding cell 2.

The machining methods employed must permit obtaining high precision in respect of the cells 2 and the pitches between the cells. The following processes may be employed alone or in association: machining by mechanical means (drilling, forming, broaching, etc.); electrochemical machining, electro-erosion machining by a wire or depression, laser cutting, cutting by means of jets of water under pressure charged with abrasives. All these processes must permit the obtaining of surface states compatible with the contact of the rod or guide tube.

Inside some of the cells 2' of the grid, the walls 3 are devoid of projecting portions constituting bosses 4. These celles 2' are reserved for the guide tubes 6 whose diameter is larger than the diameter of the fuel rods 5.

Figure 2A:
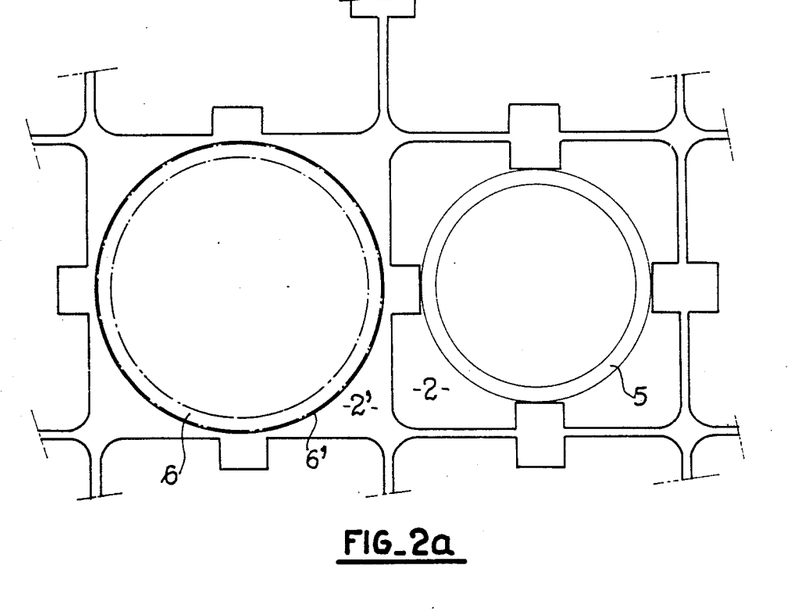
FIGS. 2a and 2b are views, similar to FIG. 2, of cells intended to receive guide tubes.
Figure 2B:
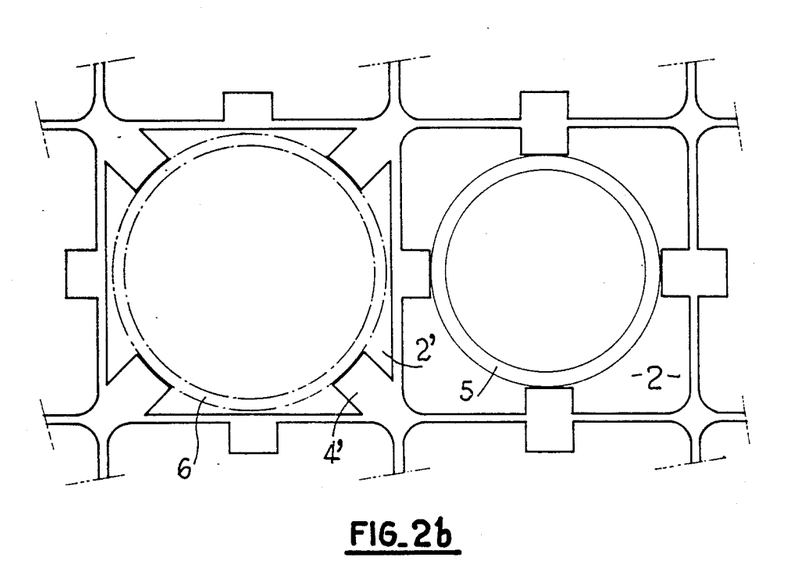

The cells 2' may also include bosses 4' or machinings permitting the provision of a passage 6' whose diameter corresponds to the diameter of a guide tube 6 as shown in FIGS. 2a and 2b.

The plate 1 is a zirconium alloy plate the drilling of which is effected in a very precise manner in order to constitute the network such as shown in FIG. 1. The precision machining method employed in particular depends on the thickness of the plate 1, this thickness varying over wide limits depending on the embodiment of the spacer-grid, as will be described hereinafter.

In the case of a spacer-grid of a standard fuel assembly of a pressurized water nuclear reactor, of type 17×17, the plate 1 will comprise 289 openings 2 constituting 289 cells of the single-piece grid obtained after machining.

Generally, the walls 3 of the grid have a thickness of between 0.3 and 1 mm, and the space between the confronting surfaces of the bosses 4 has a length of between 8.5 and 15 mm.

The cooling water of the nuclear reactor passes through the plates 1 which maintain the fuel rods 5, in the axial direction of the fuel rods, i.e., in a direction perpendicular to the plane of FIGS. 1 and 2.

Figures 2C, 5:
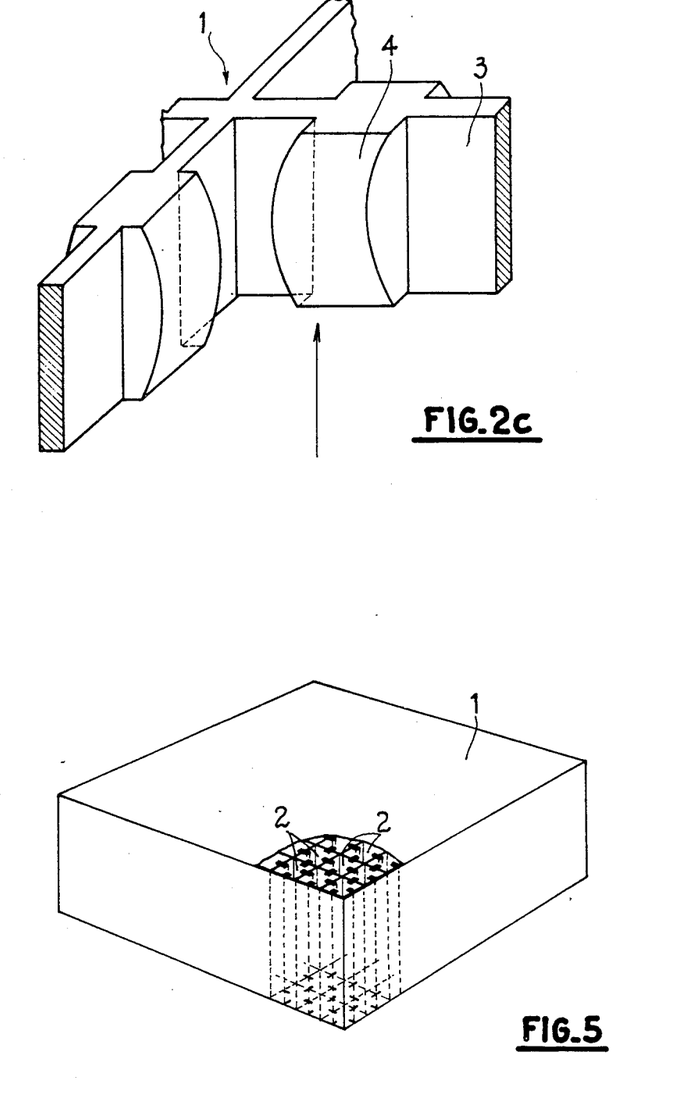
FIG. 2c is a perspective view of a part of the walls of a cell of the grid shown in FIGS. 1 and 2 according to a particular embodiment.
FIG. 5 is a perspective view of a spacer-grid according to the invention constructed in the form of a single single-piece plate.

In order to reduce the pressure drop of the cooling water as it passes through the assembly, and through each of the plates 1, the bosses 4 may be machined with a profile such as, for example, that shown in FIG. 2c. These bosses 4 have a substantially cylindrical convex surface facing toward the interior of the cells 2. Other shapes such as a "water-drop" shape, spherical shape or ovoid shape, may be used to facilitate the flow of the fluid. These shapes are such that the projected surface of the boss 4 in the plane of the plate 1 is as small as possible.

Figure 3:
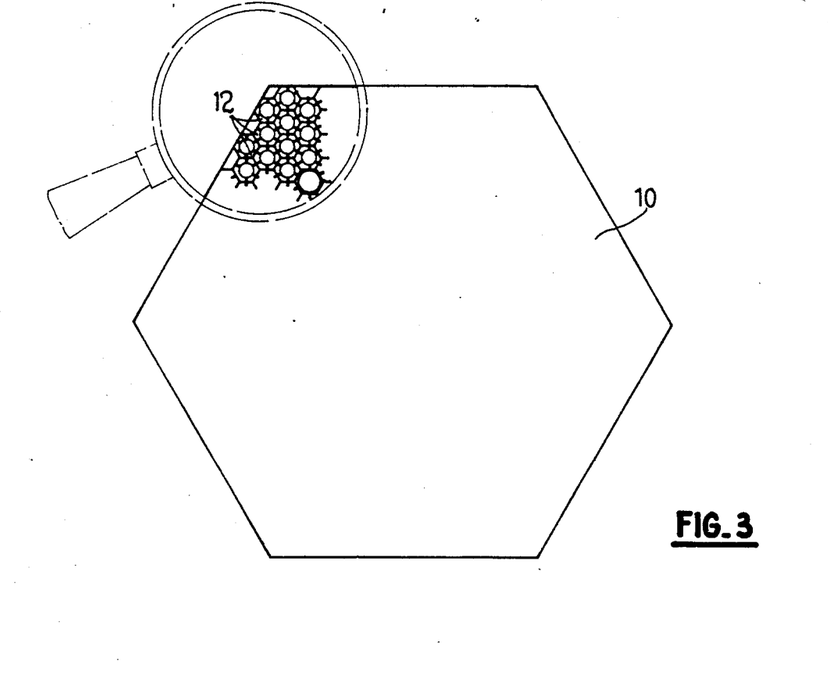
FIG. 3 is a partial plan view of a spacer-grid according to the invention of hexagonal shape and defining a triangular lattice network.
Figure 4:
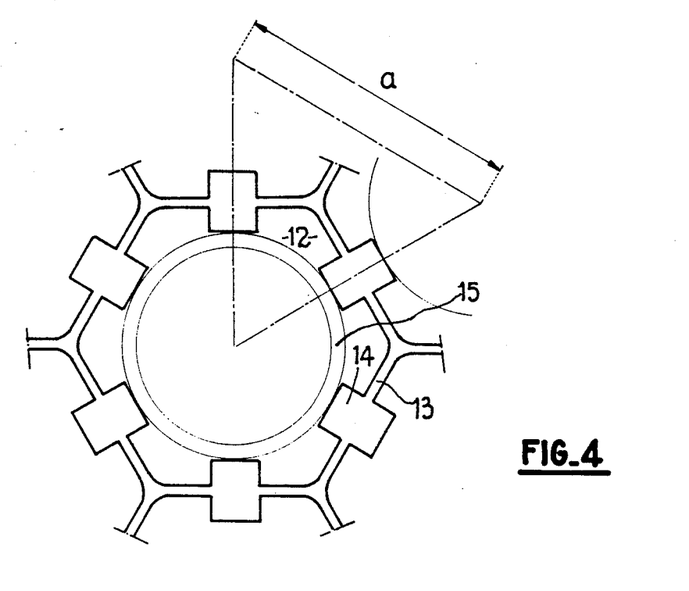
FIG. 4 is a view to an enlarged scale of a cell of the grid shown in FIG. 3.

FIGS. 3 and 4 show a second type of perforated plate 10, constituting a single-piece grid having a network of cells 12 whose lattice is triangular. This lattice has the shape of an equilateral triangle whose side a has for length the distance between two adjacent rods 15 of the assembly. This distance a is between 9 and 13 mm. The walls 13 of each of the cells 12 of the grid 10 have a thickened portion 14 constituting a bearing boss for the fuel rods 15. Each of the cells 12 of hexagonal shape thus includes six bearing bosses 14 for the rod 15 placed in this cell 12. The space between the confronting surfaces of the bosses 14 within a cell 12 is, as before, substantially equal to the outside diameter of a fuel rod or the outside diameter of the guide tube.

In the case of an assembly for a pressurized water nuclear reactor, 331 cells 12 are provided, each of which cororesponds to a throughway opening in the plate 10, 37 cells of which are adapted to receive guide tubes. The thickness of the walls 13 is, as before, between 0.3 and 1 mm, and the space between the bosses 14 has a length of 8 to 10 mm. The plates, such as 1 and 10 just described, may themselves constitute a spacer-grid for a fuel assembly of a nuclear reactor. In this case, the plates in which openings 2 are machined are of great thickness in order to ensure that the grid has sufficient strength (resistance to crushing), and also in order to avoid any interference with the grids of the adjacent fuel assemblies in the core.

Such a plate of great thickness in which openings 2 have been machined and which in itself constitutes a spacer-grid, has been shown in FIG. 5. Such a plate 1 may have a thickness of up to 70 mm. A plate of zirconium alloy of square shape and the desired thickness is machined, for example by one of the previously-described processes, to form throughout the thickness of this plate a square lattice network of openings 2 whose shape is shown in FIGS. 1 and 2.

It will be clear that it is possible to produce in the same way with a plate of great thickness, which may be as much as 70 mm, a single-piece grid having a triangular lattice such as shown in FIGS. 3 and 4.

Figure 4A:
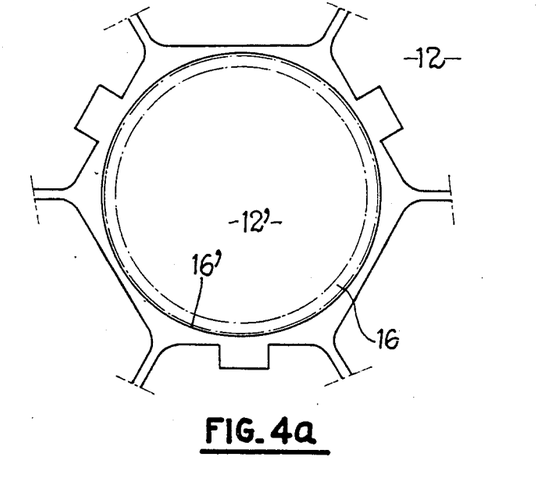
FIGS. 4a and 4b are views similar to FIG. 4 of cells adapted to receive guide tubes.
Figure 4B:
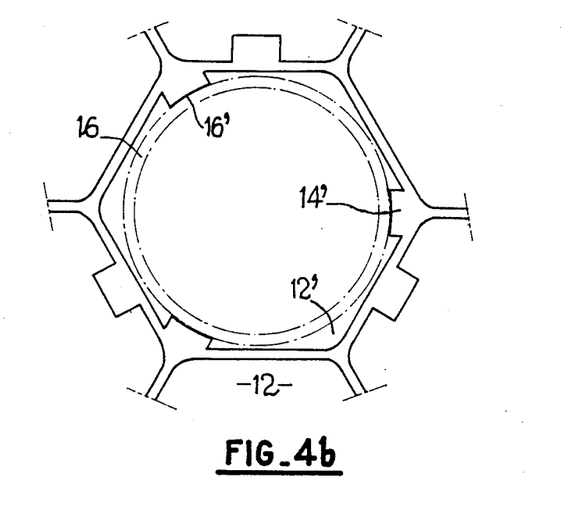

In the network of openings extending through the very thick plate, certain openings 12' may be reserved for the passage and the fixing of guide tubes. The passages of the guide tubes 16' may have, for example, shapes such as those shown in FIGS. 4a and 4b and include bosses 14'.

In order to avoid any risk of hooking between adjacent spacer-grids of an assembly, the corners of the single-piece plate, as shown in FIG. 5, may be machined to have shapes such as those defined in French Patent Application No. FR-86-04708.

A fuel assembly of a pressurized water nuclear reactor may comprise a plurality of spacer-grids constructed in the single-piece form and disposed in spaced-apart positions along the length of the assembly. An assembly having a length of about 4 m may comprise eight to twelve spacer-grids of the type shown in FIG. 5.

Figures 6, 7A, 7B:
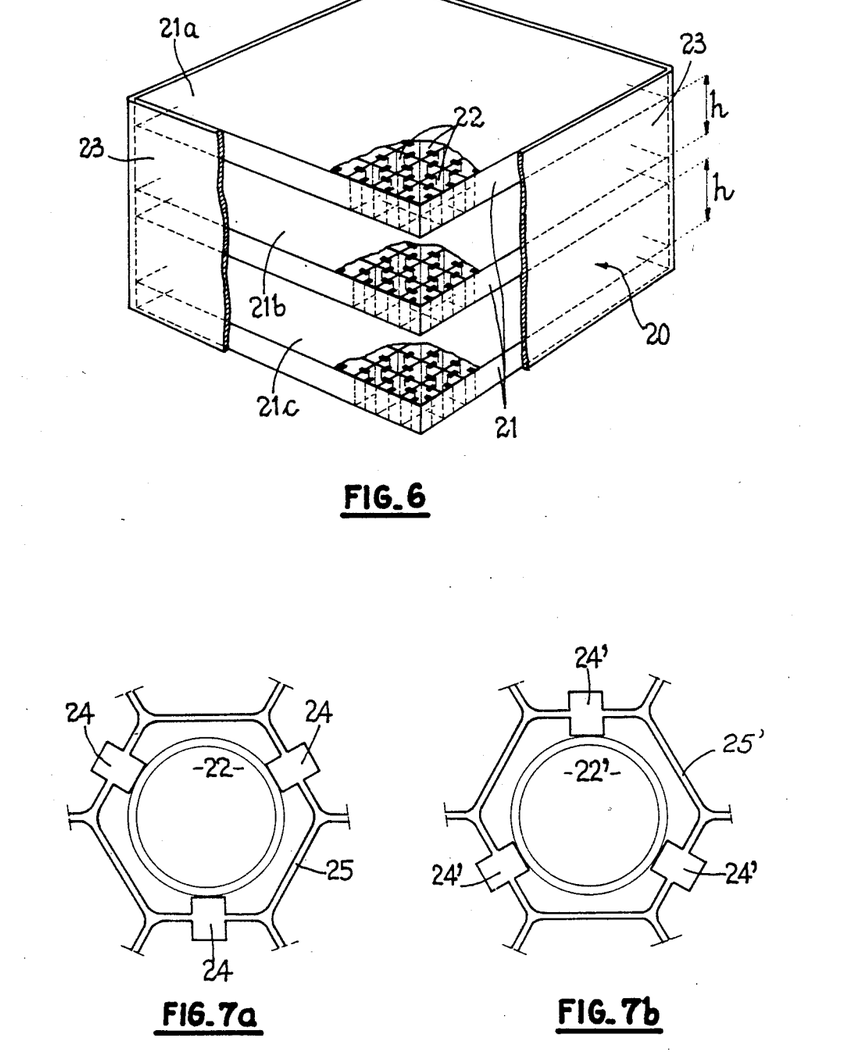
FIG. 6 is a perspective view of a spacer-grid according to the invention formed from a plurality of single-piece plates.
FIGS. 7a and 7b are plan views of cells machined in the single-piece plates constituting a spacer-grid.

FIG. 6 shows a second type of spacer-grid according to the invention. In this embodiment, the sapcer-grid 20 is constituted by three plates 21a, 21b and 21c arranged parallel to one another and spaced apart a variable vertical distance h (for example between 10 and 70 mm). The plates 21a, 21b and 21c are assembled by means of sheets 23 constituting the outer girdle element of the spacer-grid.

Each of the plates, 21a, 21b and 21c constitutes a single-piece grid such as that shown in FIGS. 1 and 2. Each of the plates is provided with a group of openings 22 arranged in accordance with a square lattice network and constituting cells of a single-piece grid, as described hereinbefore. The plates 21a, 21b and 21c are connected by the girdle sheets 23 so that the network of openings 22 are disposed in corresponding positions and are spaced apart from one another by a translation along the direction perpendicular to the plates 21. The corresponding openings 22 of the three networks of the plates 21a, 21b, 21c are therefore in alignment along the direction perpendicular to the plates, which is the vertical direction in FIG. 6. The fuel rods or the guide tubes may therefore be received in the spacer-grid 20, each one within three successive openings 22 in corresponding positions on the plates 21a, 21b and 21c.

The whole of the spacer-grid 20 will be made from a sheet of zirconium alloy, the plates 21a, 21b and 21c then having, for example, a reduced thickness relative to the embodiment of a spacer-grid employing a single-single plate as shown in FIG. 5. For reasons of rigidity and effectiveness of the transverse maintenance of the rods, this thickness will be between 2 and 15 mm.

It will be quite clear that, in the embodiment of FIG. 6, the single-piece plates 21a, 21b, and 21c may be either plates of square shape including a square lattice network of openings 22 as shown in FIGS. 1 and 2, or plates of hexagonal shape having a triangular lattice network of openings as shown in FIGS. 3 and 4, or plates having any other shape with openings disposed in accordance with an even network permitting the reception of the fuel rods and the guide tubes.

It is also quite clear that the number of plates constituting the spacer-grid need not be three, and may, for example, be two.

Two cells 22 and 22' of two assembled single-piece grids are shown in FIGS. 7a and 7b to constitute a spacer-grid such as that shown in FIG. 6. The illustrated two cells 22 and 22' have a hexagonal shape and are placed in triangular lattice networks in corresponding positions on the upper plate or single-piece grid, and on the lower plate or single-piece grid respectively.

It can be seen that only every other wall 25 (or 25') of the cells 22 (or 22') is provided with a boss 24 (or 24'). Furthermore, the bosses 24 of the cell 22 of the upper plate are disposed in positions which are angularly offset relative to the positions of the bosses 24' of the lower plate.

In this way, each of the plates or single-piece grids may be constructed in a lightened form relative to the form shown in FIGS. 3 and 4. This has the advantage of reducing the pressure drop of the grid and permitting improved cooling of the fuel rod. The fuel rods will nonetheless be maintained within the corresponding spacer-grid at points located on six different generatrices, assuring effective bearing and transverse maintenance of the fuel rods of the assembly in the region of the spacer-grid.

In the case of a spacer-grid formed by a single plate of great thickness machined in the form of a single-piece grid whose cells have a hexagonal shape and are disposed in accordance with a triangular lattice network, it is also possible to provide bearing bosses for the rods solely to every other wall of each of the cells.

As in the case of the grid 5, it is of interest, in order to avoid any risk of hooking between adjacent assembling spacer-grids, to give to the corners shapes such as those shown in the French Patent Application FR-86-04708.

Figure 8:
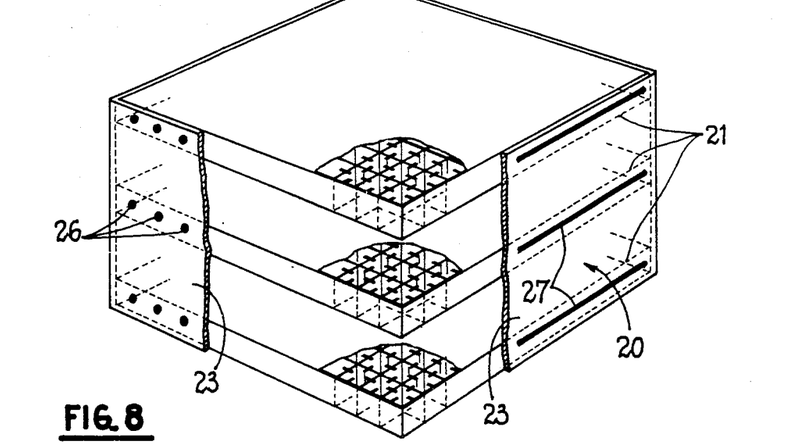
FIG. 8 is a perspective view of a spacer-grid of the type shown in FIG. 6 in accordance with a welded assembly mode.

FIG. 8 shows a spacer-grid 20 constructed in the same way as the grid shown in FIG. 6. The plates 21a, 21b and 21c, constituting single-piece grids composed of zirconium alloy, are assembled by sheets 23 of zirconium alloy which are welded to the edges of the plates 21.

The welds may be effected "by transparency", i.e. from the exterior of the sheets 23. These welds may be carried out in the form of spots 26 in alignment along the edge of the plates 21 or constitute weld beads 27 extending along the edges of the plate 21.

Figure 9:
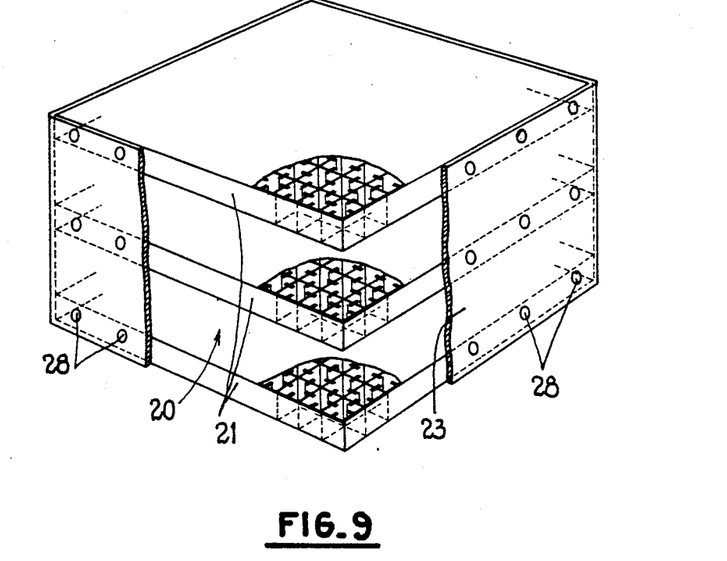
FIG. 9 is a perspective view of a spacer-grid of the type shown in FIG. 6 in accordance with a riveted assembly mode.

Shown in FIG. 9 is another manner of assembling the plates 21 and the girdle sheets 23 of a spacer-grid 20. The girdle sheets 23 are fixed to the edge of the plates 21 by rivets 28.

Figure 9A:
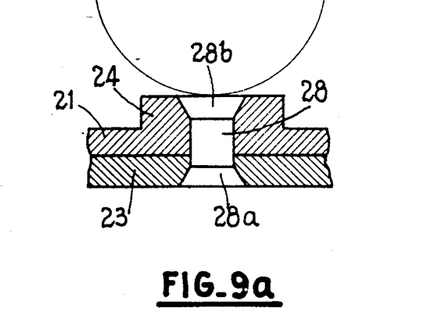
FIGS. 9a and 9b are sectional views to an enlarged scale of details of FIG. 9.

As can be seen in FIG. 9a showing the detail of a rivet 28, this rivet comprises heads 28a and 28b embedded in the sheet 23 and in the thickened metal portion of the plate 21 constituting a boss 24 of a cell.

In this way, the rivets 28 do not project from on the exterior or interior of the spacer-grid. Indeed, the exterior surface of the spacer-grids must be perfectly smooth and have no projections which might be troublesome when handling the assembly in the core of the reactor. Likewise, the projections would preclude the perfect contact of the lateral forces of the assemblies which are disposed side by side in the core of the reactor.

Figure 9B:
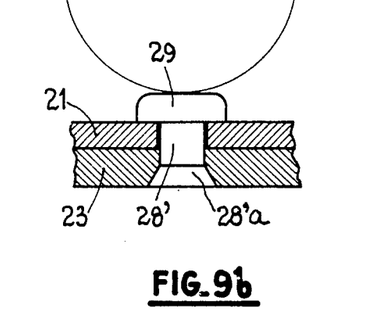

FIG. 9b shows a rivet 28' which has a head 28' embedded in the girdle sheet 23 of the spacer-grid 20 and a head 29 projecting into a cell of the plate or single-piece grid 21. In this case, the corresponding wall of the cell of the grid 21 has no boss, this being replaced by the head 29 of the rivet 28'.

Figure 10:
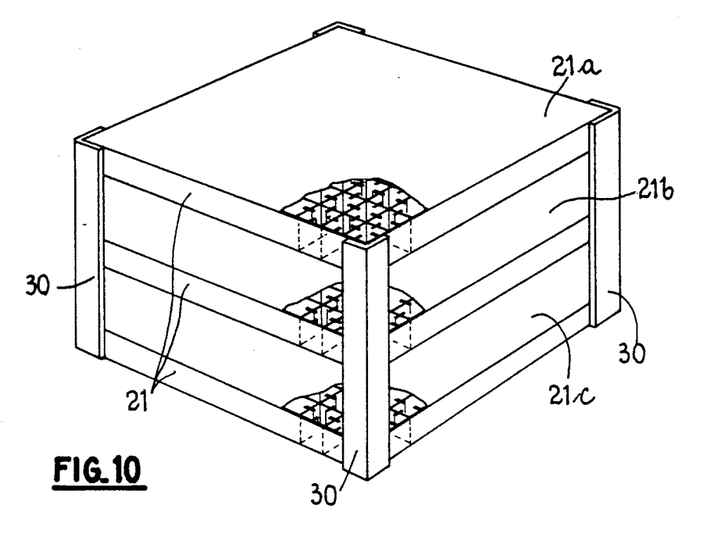
FIG. 10 is a perspective view of a spacer-grid of the type shown in FIG. 6 in accordance with a second embodiment.

A variant of the construction of the spacer-grid is shown in FIG. 10 which is constituted by three plates 21a, 21b and 21c disposed one above the other and constituting single-piece grids whose cells 2 are disposed in accordance with networks having corresponding positions in the direction perpendicular to the plates 21a, 21b and 21c. The plates 21a, 21b, and 21c are interconnected and assembled in the embodiment shown in FIG. 10 by corner angle-members 30 instead of the girdle sheets 23, shown in FIGS. 6, 8 and 9.

As in the foregoing embodiments, the single-piece grids 21a, 21b and 21c may be constructed from plates composed of zirconium alloy having a thickness of between 2 and 15 mm. The corner angle-members are also of a zirconium alloy and are connected by welding or by spot welding or by weld beads or by riveting to the edge of the plates 21.

In all the embodiments described up to now, all of the cells of the single-piece grids constituting the spacer-grid are adapted to receive either a fuel rod or a guide tube. Inside each of the cells of the grids, water passages are provided around the rod or the guide tube to permit the circulation of the cooling water of the nuclear reactor within the assembly in the reactor in operation.

Figure 11:
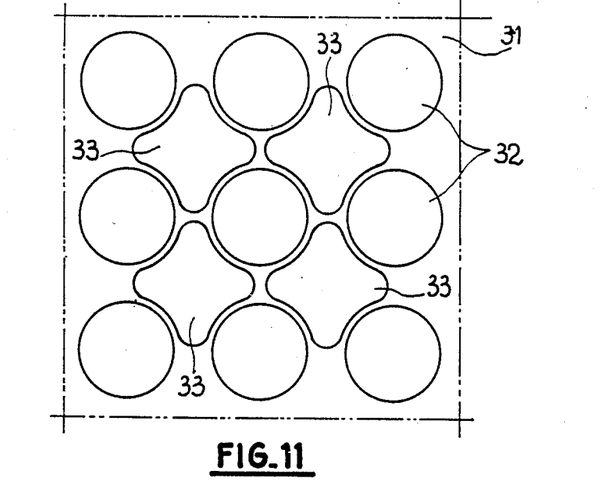
FIG. 11 is a diagrammatic plan view of a part of a spacer-grid according to the invention comprising both passages for fuel rods and water passage holes.

FIG. 11 shows a part of a plate 31 machined in such manner as to constitute a single-piece grid and comprising openings 32 and 33 of two different types.

The openings 32, which are comparable to the openings 2, 12 and 22 described hereinbefore and which constitute the cells of the grid, are adapted to receive fuel rods or guide tubes. The openings 33 are simple openings for the passage of water through the plate 31, are interposed between the openings 32 and have a more or less complex shape providing a wall thickness of the cells of the single-piece grid which is as constant as possible.

Figure 12:
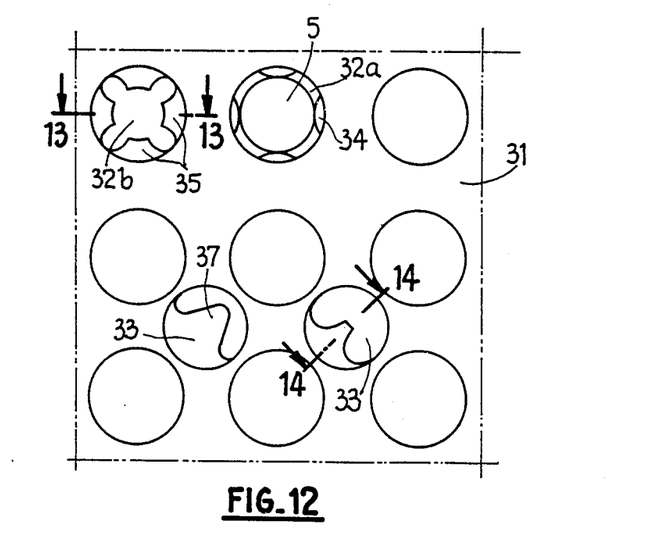
FIG. 12 is a view similar to FIG. 11 of various modifications of the fuel rod passages and water passage holes.

Two variants 32a and 32b of the openings 32 adapted to receive a fuel rod are shown in FIG. 12. The opening 32a is formed by piercing and has a circular shape and a diameter larger than the outside diameter of the rod 5. Bosses 34 machined to project inwardly of the opening 32a provide a transverse maintenance of the rod 5. The type of opening 32a constitutes a cell of the grid 31 which is absolutely comparable to the cells of the previously-described embodiments.

Figure 13:
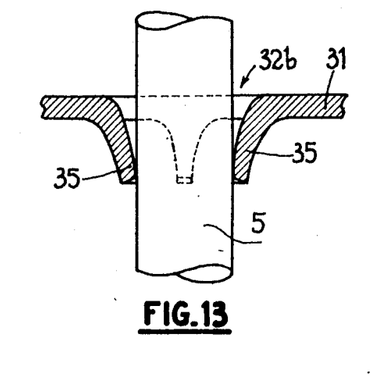
FIG. 13 is an elevational view, with a part in section taken on line 13—13 of FIG. 12, of a fuel rod in a spacer-grid according to the invention, formed by a punching operation.

When the thickness of the grid is small, the openings 32b of the grid may be produced by a punching operation on the grid 31 and may have four portions 35 which are deformed out of the plane of the plate 31, as shown in FIG. 13 where a rod 5 is shown in position inside an opening 32b, this rod 5 being maintained by the deformed portions 35 of the plate 31, in the region of the opening 32b. Thus it is possible to employ, to constitute a spacer-grid, plates 31 having a relatively small thickness which is pierced and punched so as to constitute a single-piece grid.

In the same way, the water passage openings 33 are formed by a punching operation and an operation for deforming or urging back a fin 37 constituted by the metal of the plate 31. The plate 31 has been shown in section in FIG. 14 in the region of an opening 33. It can be seen that the fin 37 is urged upwardly, i.e., in the direction opposed to the direction of urging back the portions 35 for maintaining the rod 5 shown in FIG. 13.

Figure 14:
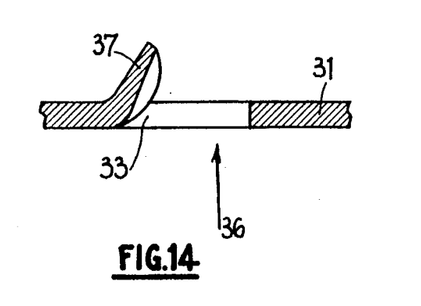
FIG. 14 is a sectional view taken on line 14—14 of FIG. 12 of the spacer-grid in the region of a water passage opening.

The fin 37 causes the deflection and the mixing of the cooling water of the nuclear reactor circulating in the assembly in the direction of the arrow 36, when the assembly including the spacer-plate 31 is disposed in the core of the reactor.

The arrangements of FIGS. 13 and 14 may be employed independently of each other or simultaneously on the same grid and ensure the function that the spacer-grid is desired to perform (mixing and mechanical strength function).

Figure 15:
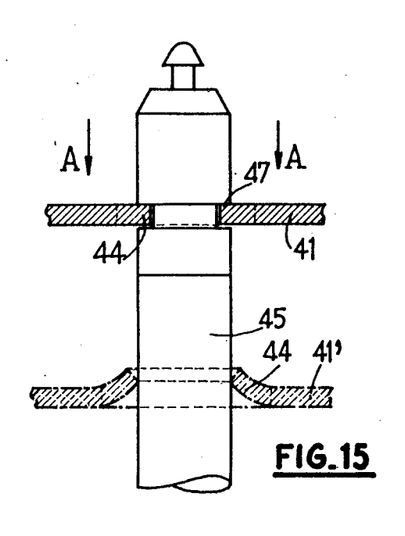
FIG. 15 is an elevational view with a part in section of a fuel rod and a corresponding part of a spacer-grid according to the invention ensuring the axial maintenance of the fuel rod.
Figure 15A:
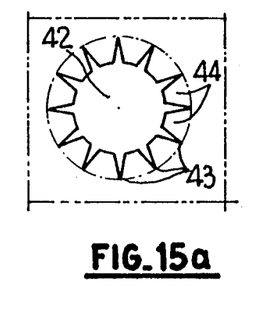
FIG. 15a is a view in the direction of arrows A—A in FIG. 15.

Shown in FIGS. 15 and 15a is an embodiment of a single-piece spacer-grid according to the invention, comprising means for axially immobilizing a rod 45 of the assembly in which the single-piece grid 41 is mounted.

The grid 41 includes, for the maintenance and fixing of the rod 45, an opening 42 constituted by a central punched out opening of circular shape and punched-away notches 43 extending the central opening in radial directions. The notches 43 define tongues 44 formed by the metal of the plate 31.

As shown in the lower part of FIG. 15 (position 41' of the plate 41), the rod 45 may be inserted in the opening 42, the tongues 44 having sufficient flexibility to be urged outwardly.

The rod 45 includes in its upper part a groove 47 in which the tongues 44 of the opening 42 are engaged when the rod is in its final position relative to the spacer-grid 41, as shown in the upper part of FIG. 15 (position 41 of the plate shown in full lines).

For this purpose, when the opening 42 and the tongues 44 have been placed in coincidence with the groove 47 by sliding the rod 45 inside the opening 42, the tongues are bent back into the plane of the plate 41 and enter the groove 47. The rod 45 is then immobilized in the axial direction inside the fuel assembly.

A single spacer-grid 41 is generally provided and comprises openings such as the opening 42 for the axial immobilization of the rods 45, this spacer-grid being the upper grid of the assembly.

Figure 16A:
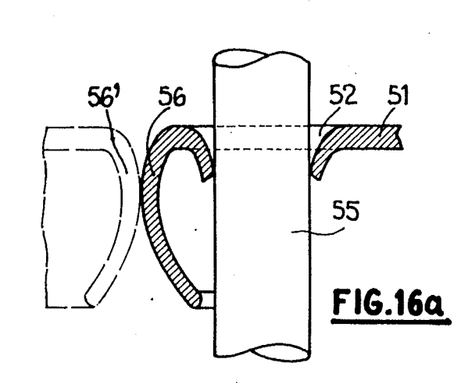
FIG. 16a is an elevational view with a part in section of a peripheral portion of a spacer-grid according to the invention.
Figure 16B:
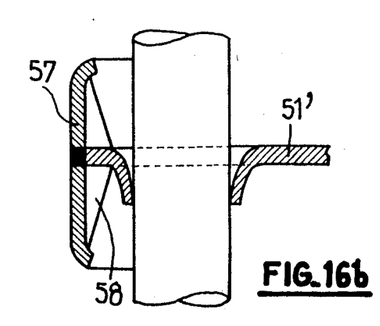
FIG. 16b is an elevational view with a part in section of a peripheral portion of a spacer-grid according to the invention in accordance with a modification.

FIGS. 16a and 16b shows two different embodiments of the peripheral part of a spacer-grid according to the invention.

In FIG. 16a, the spacer-grid 51, which is constructed in the single-piece form by punching and deforming a plate of zirconium alloy so as to constitute openings 52 for maintaining the fuel rods 55, includes edge portions 56 which are downwardly bent and are adapted to constitute the girdle element of the spacer-grid. The shape of this girdle element facilitates the handling operations owing to rounded shapes.

Furthermore, the bridge shapes shown in FIG. 16a impart to the grid a resilience which absorbs differential expansions of the assemblies while ensuring their positioning.

In the case of a spacer-grid of polygonal shape, for example of square shape, the edges of the spacer-grid corresponding to the sides of the polygon are bent downwardly and welded at their ends so as to constitute the girdle element of the spacer grid.

A part of the girdle element of the spacer-grid of a fuel assembly which is adjacent to the assembly in which the grid 51 is mounted is shown at 56'. It can be seen that the curved parts 56 and 56' come into contact for positioning and centering the assemblies with respect to one another and facilitating their relative displacements.

Shown in FIG. 16b is a second embodiment of the girdle element of a spacer-grid 51' according to the invention, this girdle element 57 being mounted and welded to the outer sides of the spacer-grid 51'. Reinforcements 58 welded to the plate 51' and the girdle element 57 increase the rigidity of the girdle element 57.

Figure 17:
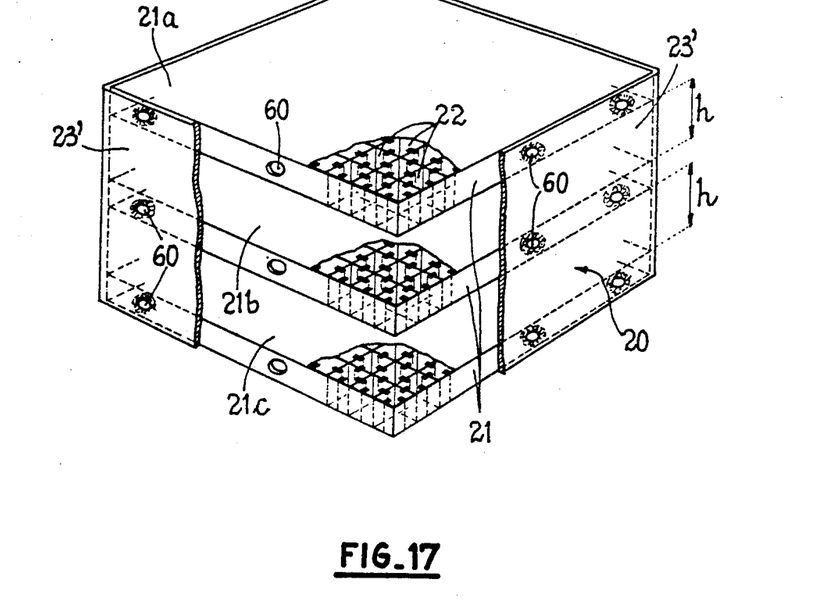
FIG. 17 is a perspective view of a spacer-grid of the type shown in FIG. 6 in accordance with another embodiment.

FIG. 17 shows a modification of a spacer-grid consisting of three plates 21a, 21b and 21c disposed one above the other and constituting single-piece grids whose cells 2 are disposed in accordance networks having corresponding positions in the direction perpendicular to the plates 21a, 21b and 21c.

The plates 21a, 21b and 21c are interconnected and assembled in the embodiment represented in FIG. 17, by means of an outer girdle element constituted by a square tube 23' of zirconium alloy in which the plates 21a, 21b and 21c are mounted. The connection is ensured by mechanical deformation of the outer girdle element constituted by the tube 23' in openings 60 provided for this purpose in one of the sides of the plates 21a, 21b and 21c.

The connection may also be achieved by means of welding or riveting.

Such a principle of a grid may of course be adapted to the case of the plates 21a, 21b and 21c of hexagonal shape.

Figure 18:
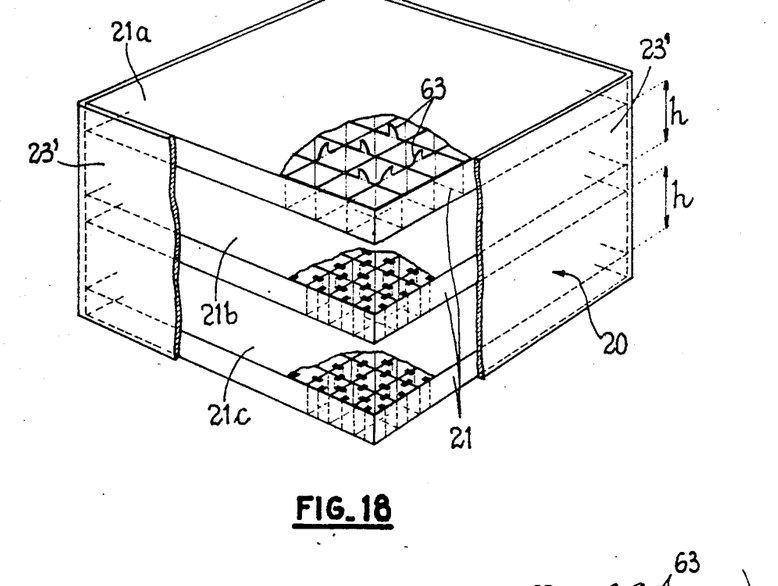
FIG. 18 is a perspective view of a spacer-grid of the type of the grid shown in FIG. 6 whose single-piece plate is replaced by a mixing fin-carrying network.

FIG. 18 shows a variant of the construction of a spacer-grid constituted by three plates 21a, 21b and 21c disposed one above the other and constituting single-piece grids whose cells 2 are disposed in accordance with networks having corresponding positions in the direction perpendicular to the plates 21a, 21b and 21c.

The plate 21a may, for example, have a mixing function for the cooling fluid, whereas the plates 21b and 21c retain their function of maintenance of the fuel rod or guide tube.

Figure 18A:
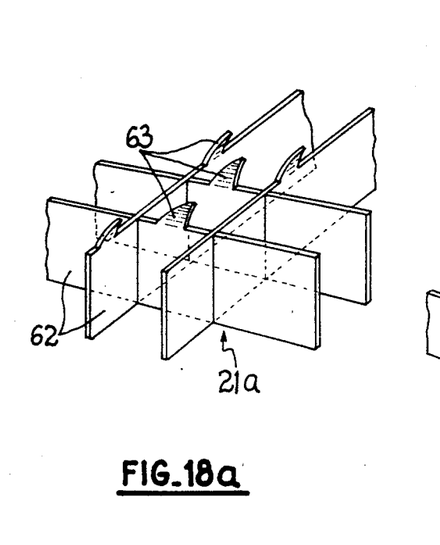
FIG. 18a is a perspective view of a first embodiment of the mixing fin-carrying network.
Figure 18B:
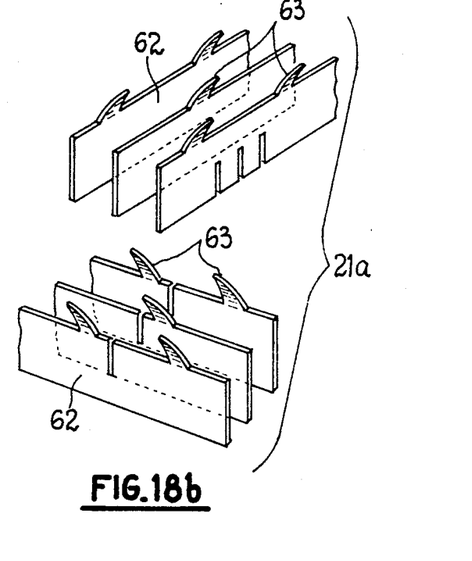
FIG. 18b is a perspective exploded view of a second embodiment of the mixing fin-carrying network.

The plate 21a may, for example, be formed in accordance with the solutions shown in FIGS. 11 and 12 or from pressed-out sheets 62 of zirconium alloy whose sole function is to support fluid mixing fins 63 (FIGS. 18a and 18b). In this way, the plate 21a constitutes a simple fin-carrying network 62, 63.

The sheets 62 may be in imbricated relation to one another in accordance with the principle shown in FIG. 18a or arranged in two levels as shown in FIG. 18b.

The assembly of all the components of the spacer-grid formed in this way may be effected in the same way as for the grids shown in FIGS. 6, 8, 9, 10 and 17.

It can be seen in the embodiments which have been described that the spacer-grids according to the invention have a simple structure and may be produced by effecting a very small number of welds, or even without any welding operation. Furthermore, the spacer-grids according to the invention may perform many functions in addition to the maintenance of the rods and may have a very dense network of passages for the fuel rods and the guide tubes.

It is possible to provide other forms of passages for the fuel rods extending through the single-piece plates of the spacer-grid and other manners of assembling the single-piece plates.

It is also possible to employ other forms of bosses and more generally other embodiments of the means for maintaining the rods in the single-piece grids.

Any other opening in the plates of the spacer-grid may also be provided which have various functions, for example that of the distribution and mixing of the cooling fluid circulating in the fuel assembly.

Any form of an even network may be provided according to which the passages of the rods are disposed in the spacer grids.

The spacer-grids according to the invention may be employed for fuel assemblies intended for nuclear reactors of any type cooled with light water, whether these reactors be of the pressurized water, boiling water or spectrum variation type.

We claim:

1. Spacer-grid for a fuel assembly of a light water nuclear reactor, which assembly comprises a bundle of parallel fuel rods in which some rods are replaced by guide tubes and in respect to which the transverse maintenance is ensured by a plurality of spacer-grids spaced apart along the length of the rods and each defining an even network of passages for receiving said fuel rods and said guide tubes, said spacer-grid comprising
    (a) at least two single-piece plates arranged parallel to each other and separated by a distance of up to 70 mm in a direction perpendicular to the plates, the passages of the plates being arranged in accordance with networks so as to be in alignment with each other by a translation in a direction perpendicular to the plates; and
    (b) connection parts rigidly fixed to lateral sides of said plates and interconnecting said plates.

2. Spacer-grid according to claim 1, comprising a tube having a section which corresponds to the section of said plates and is fixed to lateral sides of said plates for interconnecting said plates.

3. Spacer-grid according to claim 1, comprising angle-members fixed to the plates in the region of corners of said plates, which plates are in corresponding positions.

4. Spacer-grid according to claim 1, comprising a girdle element having a shape facilitating the handling of the fuel assembly.

5. Spacer-grid according to claim 4, wherein the girdle element has a shape permitting the positioning of the corresponding assembly in the core of the reactor and the absorption of differential expansions with adjacent assemblies.

6. Spacer-grid according to claim 1, wherein the single-piece plate has water passage openings extending through the plate in addition to said passages for the fuel rods and guide tubes of the assembly.

7. Spacer-grid according to claim 6, wherein the passages for the fuel rods and guide tubes and the water passage openings are formed by a punching of the plate and include portions which are deformed out of the plane of the plate.

8. Spacer-grid according to claim 7, wherein the deformed portions of the passages for the fuel rods constitute bearing devices for the rods.

9. Spacer-grid according to claim 6, wherein the deformed portions of the water passage openings constitute fins for deflecting and mixing a stream of cooling water passing through the fuel assembly.

10. Spacer-grid according to claim 1, wherein in the regions of the passages for the fuel rods extending through at least one of the plates, said at least one plate has blanked-out portions defining deformable tabs which are capable of being outwardly bent to permit the positioning of a rod in the opening and capable of being put back into the plane of the plate in the region of a groove provided in the respective rod which includes a groove for receiving said tabs and axially immobilizing said rod.

11. Spacer-grid according to claim 1, wherein at least one of the plates is bent in the vicinity of edges thereof so as to constitute a girdle means surrounding the spacer-grid throughout the periphery thereof.

12. Spacer-grid according to claim 1, wherein a girdle element is mounted and welded to the periphery of at least one of the plates so as to constitute a girdle element of the spacer-grid.

13. Spacer-grid according to claim 1, wherein the connection parts consist of metal sheets.

14. Spacer-grid according to claim 13, wherein the metal sheets are fixed on the lateral sides of the plates by welds effected from the exterior of the sheets and through the thickness of said sheets.

15. Spacer-grid according to claim 13, wherein the sheets are fixed on the lateral sides of the plates by deformation of the sheets into openings provided in the lateral sides of the plates.

* * * * *